(12) United States Patent
Zimmerman, Jr. et al.

(10) Patent No.: US 11,116,134 B2
(45) Date of Patent: Sep. 14, 2021

(54) SEGMENTED CORN PROCESSING ROLL

(71) Applicant: Horning Manufacturing, LLC, New Holland, PA (US)

(72) Inventors: Lewis Zimmerman, Jr., New Holland, PA (US); David Horning, East Earl, PA (US); Leon H. Horning, Jr., Ephrata, PA (US)

(73) Assignee: Horning Manufacturing, LLC, East Earl, PA (US)

( * ) Notice: Subject to any disclaimer, the term of this patent is extended or adjusted under 35 U.S.C. 154(b) by 276 days.

(21) Appl. No.: 15/924,107

(22) Filed: Mar. 16, 2018

(65) Prior Publication Data

US 2018/0199512 A1    Jul. 19, 2018

Related U.S. Application Data

(63) Continuation-in-part of application No. 15/195,595, filed on Jun. 28, 2016, now Pat. No. 9,918,432.

(51) Int. Cl.
| | | |
|---|---|---|
| *A01D 82/02* | (2006.01) | |
| *B02C 4/30* | (2006.01) | |
| *A01D 43/08* | (2006.01) | |
| *A01D 43/10* | (2006.01) | |

(52) U.S. Cl.
CPC ......... *A01D 82/02* (2013.01); *A01D 43/081* (2013.01); *B02C 4/30* (2013.01); *A01D 43/10* (2013.01)

(58) Field of Classification Search
CPC ...... A01D 82/02; A01D 43/081; A01D 43/10; A01D 43/107; B02C 4/30
See application file for complete search history.

(56) References Cited

U.S. PATENT DOCUMENTS

| | | | | |
|---|---|---|---|---|
| 1,360,499 A | * | 11/1920 | Clark ................... | B02C 4/30 |
| | | | | 241/6 |
| 1,360,887 A | * | 11/1920 | Clark ................... | B02C 4/30 |
| | | | | 241/235 |
| 6,050,070 A | * | 4/2000 | Cook .................... | A01D 82/00 |
| | | | | 56/14.1 |

(Continued)

FOREIGN PATENT DOCUMENTS

| | | | | |
|---|---|---|---|---|
| EP | 1516523 B1 | | 1/2008 | |
| EP | 2420131 A1 | * | 2/2012 | ............ B02C 4/30 |
| GB | 1206152 A | * | 9/1970 | ............ A01D 82/02 |

*Primary Examiner* — Alicia Torres
(74) *Attorney, Agent, or Firm* — Miller Law Group, PLLC

(57) ABSTRACT

Crop processing rolls for operative use in forage harvesters are formed from independent segments having a plurality of first grooves that are oriented in a parallel manner with second smaller grooves intersecting the ridges to form discrete teeth from the ridges. The ridges can be formed vertically, horizontally or in a spiraled pattern with the smaller second grooves oriented into a spiraled pattern to form the discrete teeth. Crop processing roll segments can be formed in this manner and assembled into full processing rolls with the spiraled second grooves being oriented in opposing directions from adjacent segments. The number of segments can vary from two to eight individual segments with the second grooves breaking ridges into discrete teeth on adjacent segments forming a chevron pattern at intersecting positions along the longitudinal length of the processing roll.

17 Claims, 11 Drawing Sheets

(56) References Cited

U.S. PATENT DOCUMENTS

| | | | | |
|---|---|---|---|---|
| 6,131,837 A | * | 10/2000 | Wanner | A01D 43/086 |
| | | | | 241/101.742 |
| 6,251,008 B1 | | 6/2001 | Mietzel | |
| 7,322,174 B2 | | 1/2008 | Desnijder | |
| 8,480,019 B1 | | 7/2013 | Sherer | |
| 2015/0129698 A1 | * | 5/2015 | Olson | B02C 4/32 |
| | | | | 241/230 |

* cited by examiner

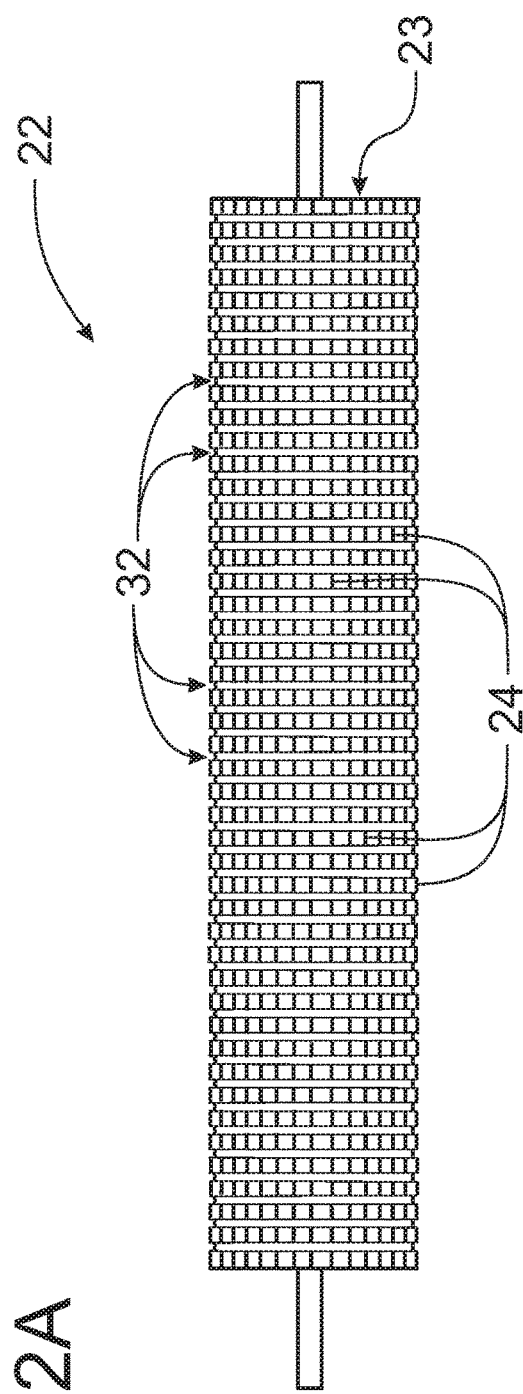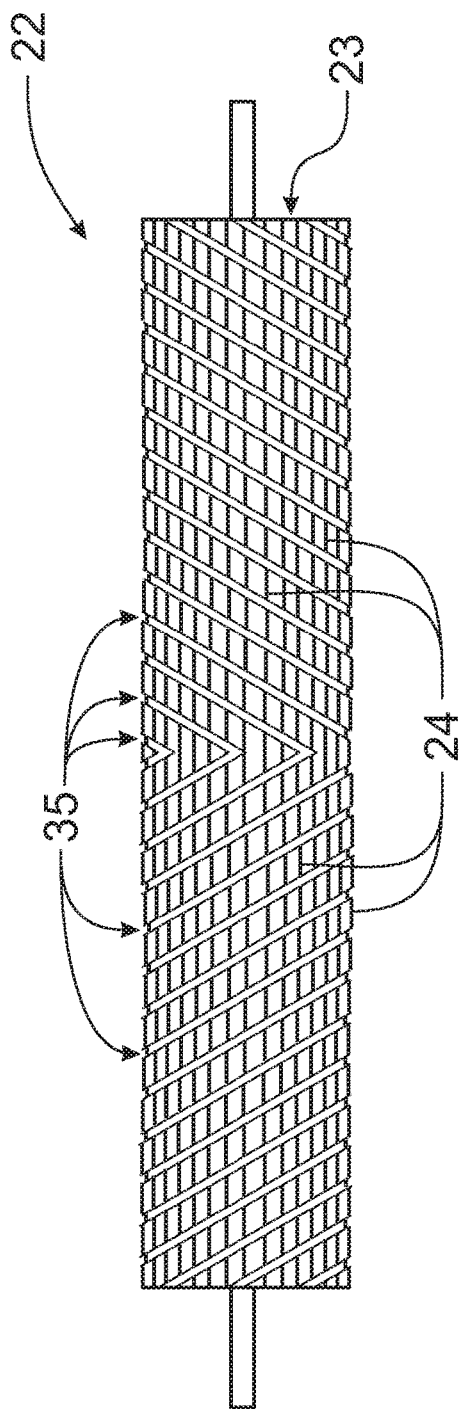

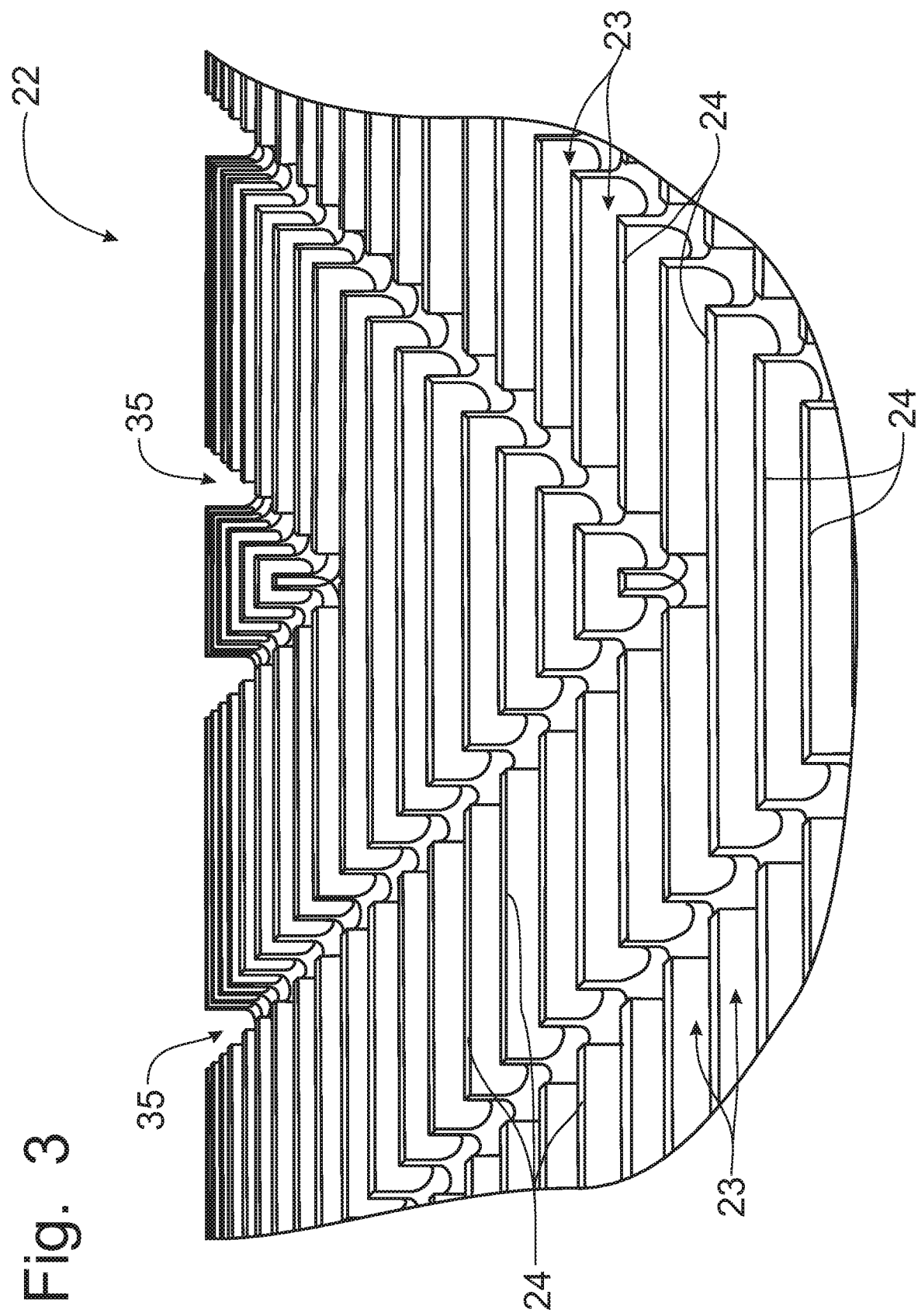

Fig. 4A
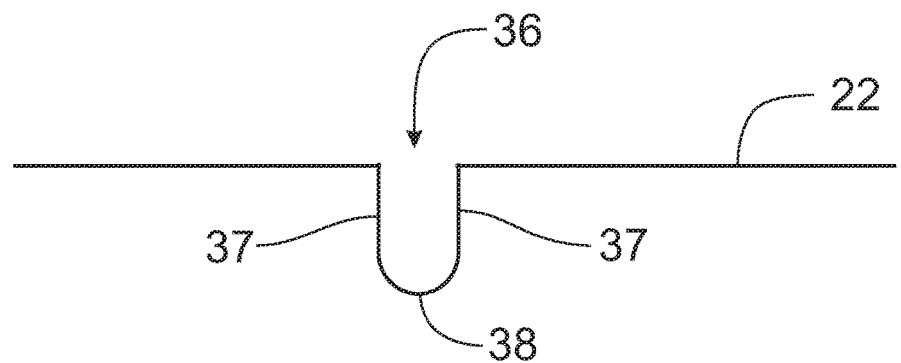
Fig. 4B
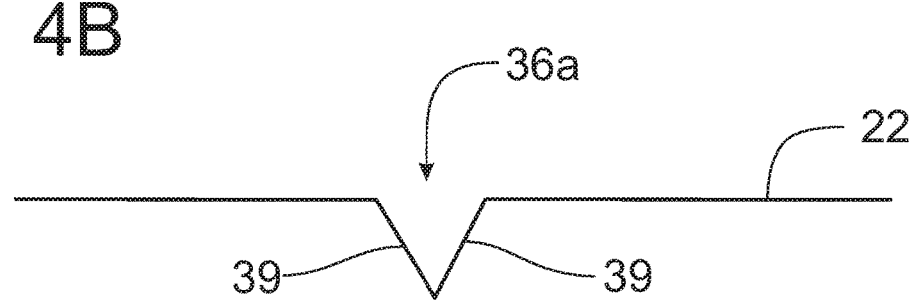
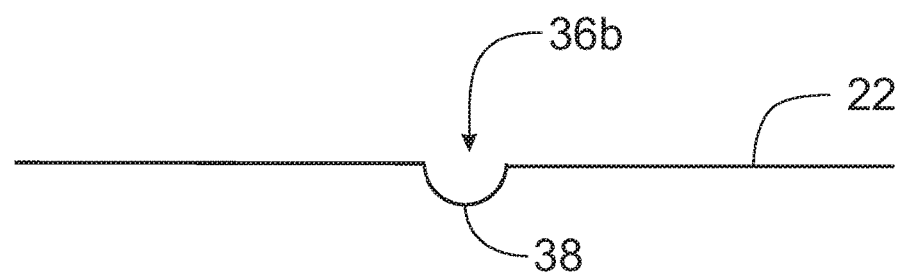
Fig. 4C

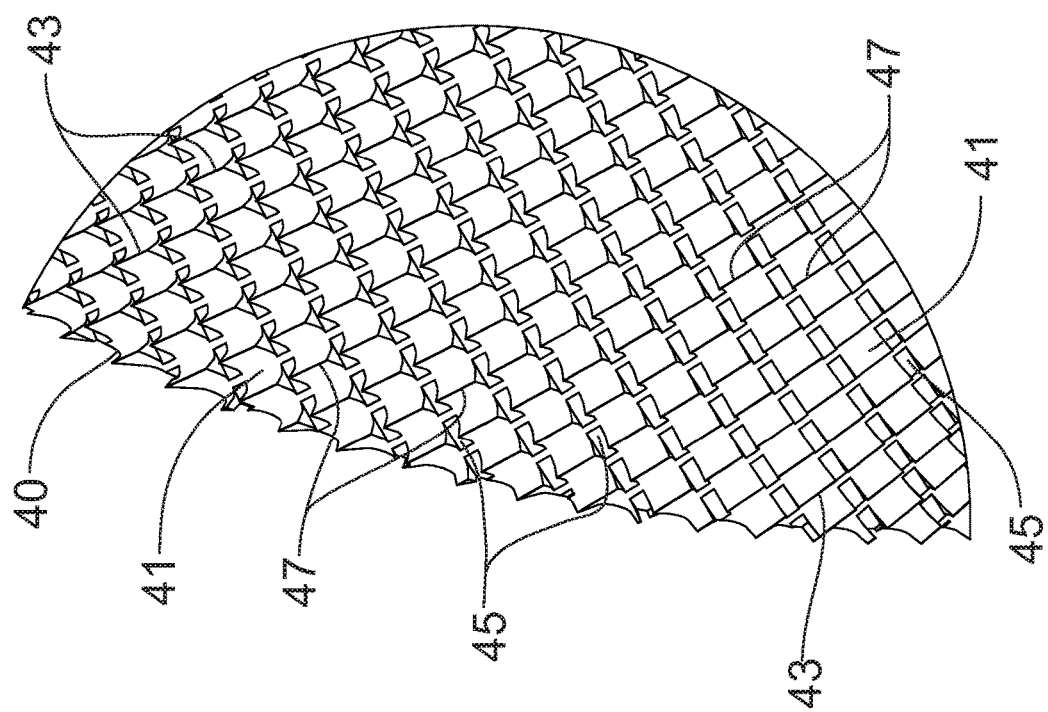
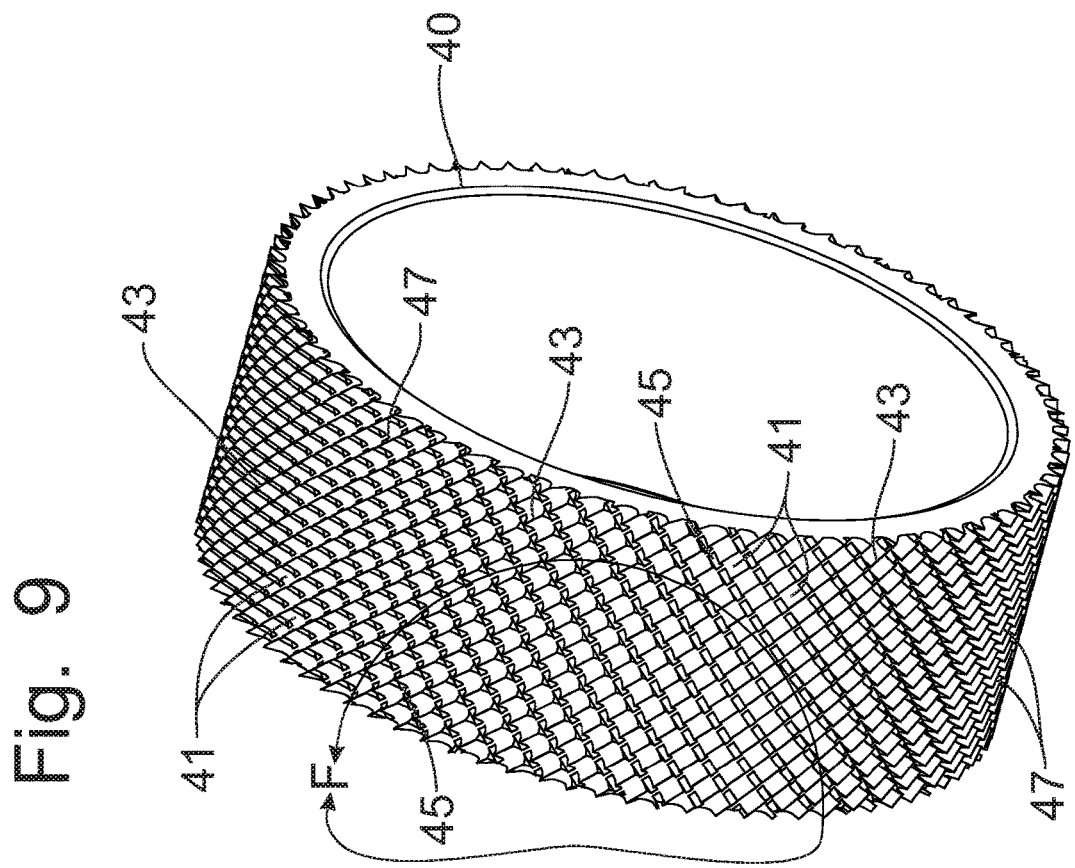

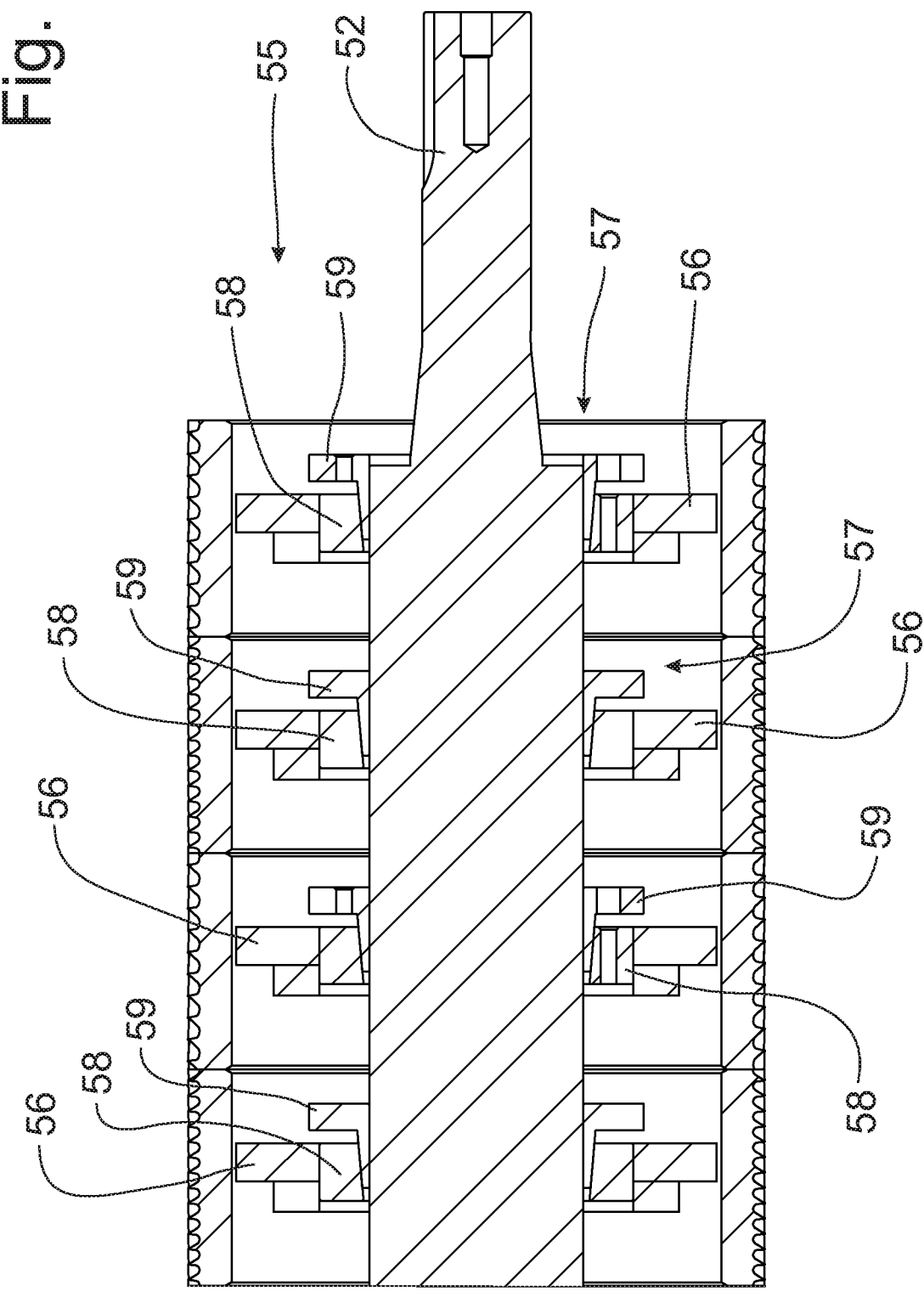

SEGMENTED CORN PROCESSING ROLL

CROSS-REFERENCE TO RELATED APPLICATIONS

This application is a continuation-in-part of U.S. patent application Ser. No. 15/195,595, filed on Jun. 28, 2016, and granted as U.S. Pat. No. 9,918,432, on Mar. 20, 2018, which claims domestic priority on U.S. Provisional Patent Application Ser. No. 62/188,322, filed on Jul. 2, 2015, the contents of which is incorporated herein by reference.

FIELD OF THE INVENTION

This invention deals generally with forage harvesters, and more specifically with a processing roll that yields higher flow-through capacity than is presently available in the corn kernel cracking section of a forage harvester.

BACKGROUND OF THE INVENTION

Forage harvesters are mobile machines designed to chop whole corn plants into small pieces to be fed to cattle and other livestock. Conventional forage harvesters are manufactured with a cutterhead formed with spiraled knives and rotate about a horizontal axis to chop forage material, such as corn or alfalfa, into small pieces that are typically fermented through a process referred to as ensilage. The forage harvester first severs the plants from the ground and conveys the severed plants into the path of the rotating cutterhead. By manipulating the speed at which the crop material is conveyed and the speed at which the cutterhead is rotated, the length of the small pieces of crop material can be varied as desired by the operator.

Forage harvesters can also utilize a pair of counter rotating processing rolls which rotate about parallel axes and define a gap therebetween. The crop material can pass through this gap after being chopped into small pieces by the rotating cutterhead to crack the kernels of corn that may be in the flow of crop material exiting the cutterhead. By cracking the corn kernels, livestock, particularly dairy cattle, have improved digestibility, and produced more and higher quality milk. The crop material discharged from between the corn processing rolls is fed into a blower that moves the chopped crop material through a discharge chute to be deposited into a container, such as a forage wagon that s typically connected to the forage harvester and trails behind the harvester to receive the chopped crop material. Once filled, the forage wagon is disconnected and taken to a storage facility where the forage wagon s emptied and returned to the forage harvester for refilling.

Conventional corn processing rolls are constructed with longitudinally extending grooves machined into the rolls, which are then reduced to individual teeth by a continuous spiral groove that is machined around the circumference of the roll to form peaks and valleys along the longitudinal, axial length of the outer circumferential surface of the corn processing rolls. In cross-section, these peaks and valleys can resemble saw teeth.

Due to the high cost of forage harvesters and limited harvesting time when the crop is ready to be harvested, harvesting speed is very critical to a successful operation of the forage harvester. One of the known limitations on the harvesting speed in forage harvester configurations that utilize corn processing rolls is the operating speed of the corn processing rolls. With increasing harvesting speeds being demanded of the operation of forage harvesters, the corn processing rolls require advance design to prevent the corn processing rolls from being a bottleneck in the operation of a forage harvester.

Known prior art machines have attempted to overcome this limitation by running the corn processing rolls at higher speeds, but have had limited success because of centrifugal force limits on the rolls and speed limitations on the bearings rotatably supporting the corn processing rolls. Another known prior art approach to increasing operating speeds approach has been to space the peaks on the roll surfaces farther apart, but this technique results in some kernels passing between the corn processing rolls without being cracked.

A representative example of the design of corn processing rolls for use in a forage harvester is disclosed in U.S. Pat. No. 8,480,019, granted on Jul. 9, 2013, to Bob A. Scherer, et al, in which the corn processing roll is formed with a series of longitudinally spaced grooves that define elongated axially aligned ridges between the longitudinal grooves. The corn processing roll then goes through a subsequent manufacturing process to form a spiraled groove extending circumferentially around the corn processing roll, as is best seen in FIG. 4. The longitudinal and spiral grooves disclosed in the '019 patent are formed with a v-shaped bit that creates corresponding V-shaped grooves, resulting in discrete teeth around the circumference of the corn processing roll that have a larger base than the top portion of the respective tooth, as is best seen in FIG. 5 of the '019 patent.

Corn processing rolls have been manufactured by Horning Manufacturing, LLC, for many years in a variety of configurations, including corn processing rolls with longitudinal and spiral grooves similar to that of the '019 patent, but formed with a rounded bit that creates vertical sides of the respective teeth around the circumference of the corn processing rolls. Certain configurations of the Horning Manufacturing, LLC, corn processing rolls have also been operated at differential speeds of rotation to provide a more aggressive shredding of the crop material being chopped by the forage harvester.

These corn processing rolls, such as is represented in the '019 patent, formed with a spiral groove around the circumference, irrespective of the shape of the grooves, have a tendency to urge the movement of the crop material passing between the crop processing rolls toward the end of the corn processing rolls that faces the leading slope of the spiral groove. In other words, the spiral fighting of the circumferential groove pushes crop material toward the leading end of the rolls. While the leading slope of the circumferential spiral is not very aggressive, there has been sufficient movement of the crop material toward the leading end to cause more failures for the hearings supporting the rotation of the corn processing rolls at the leading end than occur at the trailing end.

It would be desirable to provide a configuration of corn processing rolls for use in forage harvesters that would facilitate the high speed harvesting operation of forage harvesters without sacrificing quality of operation. It would also be desirable to provide a configuration for corn processing rolls that would not overly stress the bearings on one end of the corn processing roll as compared with the opposing end of the corn processing roll.

SUMMARY OF THE INVENTION

It is an object of this invention to overcome the disadvantages of the prior art by providing corn processing rolls that are formed with teeth formed from spiraled grooves crossing ridges formed from larger grooves formed in the surface of the processing roll.

It is a feature of this invention that the ridges formed by parallel grooves are broken into discrete teeth by separate grooves crossing said ridges.

It is an advantage of this invention that the ridges can be formed horizontally, vertically or spiraled across the surface of the processing roll.

It is another advantage of this invention that the ridges are formed by parallel first grooves with the teeth being formed from the ridges by smaller second grooves that are not formed as deeply as the first grooves.

It is another object of this invention that the processing rolls can be formed from segments that are joined together to form the full processing roll with an axial drive shaft connected to provide rotation of the segmented processing roll.

It is still another feature of this invention that adjacent segments of the processing roll can have the discrete teeth angled in opposing directions to form a chevron pattern between adjacent segments.

It is still another advantage of this invention that multiple chevron groove or teeth patterns can be formed along the length of a crop processing roll to urge movement of the crop being processed in different corresponding directions.

It is another feature of this invention that the segment of the crop processing roll, or even the entire crop processing roll, can be formed from vertically orient first grooves that create ridges in longitudinally spaced apart rings with the smaller second grooves being formed in a spiral pattern to form the discrete teeth from the ridges.

It is still another feature of this invention that the segment of the crop processing roll, or even the entire crop processing roll, can be formed from horizontally extending first grooves that create longitudinal ridges that are broken into discrete teeth by smaller second grooves that are formed in a spiraled pattern.

It is yet another feature of this invention that the segment of the crop processing roll, or even the entire crop processing roll, can be formed from spiraled first grooves forming spiraled ridges that are broken into discrete teeth by spiraled smaller second grooves that are oriented in an opposing direction from the first grooves.

It is yet another feature of this invention that the segment of the crop processing roll, or even the entire crop processing roll, can be formed from spiraled first grooves forming spiraled ridges that are broken into discrete teeth by horizontally oriented smaller second grooves.

It is yet another feature of this invention that the segment of the crop processing roll, or even the entire crop processing roll, can be formed from spiraled first grooves forming spiraled ridges that are broken into discrete teeth by vertically oriented smaller second grooves.

It is another object of this invention to overcome the disadvantage of the prior art by providing corn processing rolls for use in forage harvesters and having a chevron groove pattern formed into the processing rolls.

It is still another object of this invention to provide corn processor rolls that have grooves formed therein and arranged in a chevron pattern.

It is a feature of this invention that the rotation of the crop processing rolls urges movement of the crop material being processed away from the bearings at the ends of the crop processing rolls.

It is an advantage of this invention that the bearings for the crop processing rolls can have a longer operating life.

It is another advantage of this invention that the opposing bearings rotatably supporting the crop processing rolls should have substantially equal operating lives without one bearing prematurely failing relative to the opposing bearing.

It is another feature of this invention that the grooves cut into crop processing rolls are sloped in opposing spiraled directions to meet at a V-shaped intersection at the center of the crop processing roll.

It is still another advantage of this invention that the crop processing rolls provide effective operation without requiring the operating speed of rotation of the crop processing rolls to be increased.

It is still another object of this invention to provide a crop processing roll with a semi-chevron groove pattern that has opposing spiraled slopes to the grooves formed in the surface of the crop processing roll extending from the opposing ends of the crop processing rolls without having the grooves intersect at the center of the crop processing roll.

It is still another feature of this invention that the semi-chevron configuration of circumferential grooves does not create and leave a short tooth formed from the ridge at the intersection of the oppositely oriented circumferential grooves.

It is yet another object of this invention to provide a crop processing roll for use in forage harvesters to process crop material, wherein the crop processing toll is durable in construction, inexpensive of manufacture, carefree of maintenance, facile in assemblage, and simple and effective in use.

These and other objects, features and advantages are accomplished according to the instant invention by providing crop processing rolls for operative use in forage harvesters. The crop processing rolls are formed with a plurality of first grooves that are oriented in a parallel manner with second smaller grooves intersecting the ridges to form discrete teeth from the ridges. The ridges can be formed vertically, horizontally or in a spiraled pattern with the smaller second grooves oriented into a spiraled pattern to form the discrete teeth. Crop processing roll segments can be formed in this manner and assembled into full processing rolls with the spiraled second grooves being oriented in opposing directions from adjacent segments. The number of segments can vary from two to eight individual segments with the second grooves breaking ridges into discrete teeth on adjacent segments forming a chevron pattern at intersecting positions along the longitudinal length of the processing roll.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 2A is an elevational view of a first embodiment of a corn processing roll incorporating the principles of the instant invention;

FIG. 2B is an elevational view of a second embodiment of a corn processing roll incorporating the principles of the instant invention;

FIG. 3 is an enlarged perspective view of a central portion of the processing roll incorporating the configuration of the second embodiment of the instant invention as shown in FIG. 2B;

FIG. 4A is a schematic view of a first groove profile embodiment;

FIG. 4B is a schematic view of a second groove profile embodiment;

FIG. 4C is a schematic view of a third groove profile embodiment;

FIG. 9 is a perspective view of a segment of a crop processing roll depicting a sixth embodiment of the instant invention;

FIG. 10 is an enlarged partial perspective view of a portion of the segment of the sixth embodiment of a crop processing roll corresponding to circle F of FIG. 9;

FIG. 12 is an enlarged partial cross-sectional view of the assembled crop processing roll of FIG. 11 to show the apparatus for mounting the individual segments on a central drive shaft.

DETAILED DESCRIPTION OF THE PREFERRED EMBODIMENT

Figure 1:
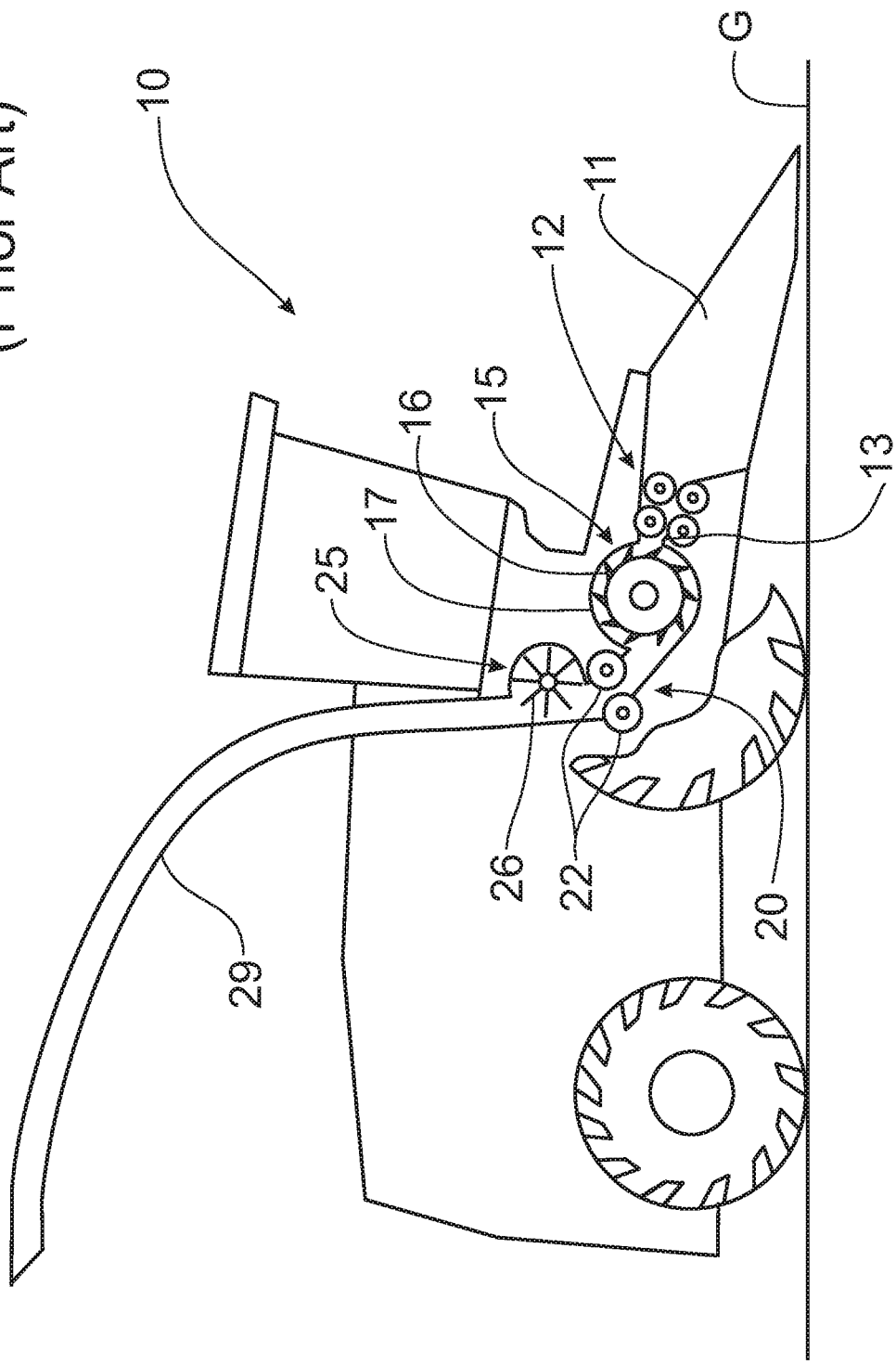
FIG. 1 is a schematic partial cross-sectional view of a conventional forage harvester having a corn processing unit installed between the cutterhead and the blower.

Referring to the drawings, corn processing rolls incorporating the principles of the instant invention can best be seen. A conventional forage harvester 10, as depicted schematically in FIG. 1, includes a header 11 at the forward end thereof to collect crop material from the surface of the ground G, typically by severing the crop adjacent to the ground G and conveying the severed crop material rearwardly for further harvesting. The severed crop material is typically delivered to a feed roll mechanism 12 that orients the crop material as a flat mat that is advanced toward a rotating cutterhead 15 having knives 16 mounted thereon to sever the crop material into small pieces as the mat of crop material passes over a shear bar 13. The rapidly rotating cutterhead 15 rotating within a housing 17 propels the severed crop material pieces to the corn processing roll assembly 20 having a pair of corn processing rolls 22 separated by a gap through which the propelled comminuted crop material pieces pass.

One of the corn processing rolls 22 is normally biased toward the opposing corn processing roll 22 by springs (not shown) that keep the spacing minimized to provide the operation of cracking the kernels of corn within the pieces of crop material passing through the corn processing roll assembly 20. Furthermore, the respective rolls 22 are normally driven at differential speeds to shred the crop material passing between the two rolls 22. The rotating corn processing roll assembly 20 in turn propels the processed pieces of crop material upwardly into a blower 25 having vanes 26 that project the chopped and processed crop material through a discharge chute 29 into a trailing forage wagon (not shown) that collects the discharged crop material for transport to a storage facility (not shown).

The present invention increases the quantity of chopped corn plants, particularly with respect to the corn kernels found in the supply of chopped corn plants, that the corn processing rolls provide without requiring the speed of rotation of the corn processing rolls be increased. This increase in productivity is accomplished by placing multiple notches along the length of the longitudinally oriented peaks formed along the axial length of the outer surface of the corn processing rolls 22. Furthermore, by use of the instant invention, the preferred spacing between the longitudinal peaks can be maintained and multiple longitudinal teeth are created by the placement of the circumferential grooves around the corn processing rolls to intersect the longitudinal peaks, as is best seen in FIGS. 2A and 2B. Since the overall diameter of the corn processing rolls are not increased, and since the corn processing rolls can be operated at the conventional speed of the previous corn processing rolls, the rolls 22 formed according to the instant invention can be retrofitted into existing machines to increase the capacity thereof by merely replacing the previous corn processing rolls with rolls manufactured according to the principles of the instant invention.

Figure 2C:
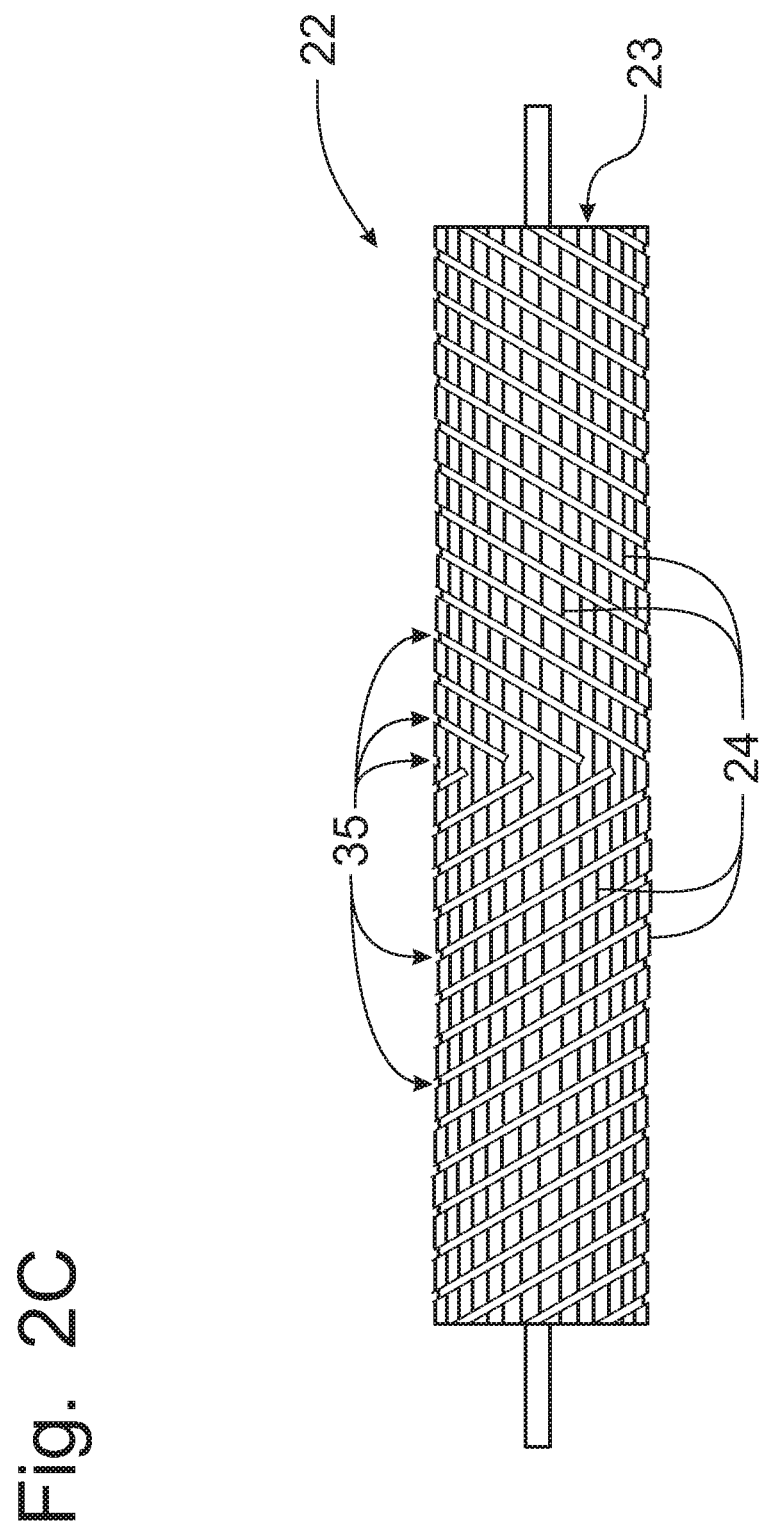
FIG. 2C is an elevational view of a third embodiment of a corn processing roll incorporating the principles of the instant invention.

Three configurations of corn processing rolls 22 according to the principles of the instant invention are depicted in FIGS. 2A-2C. The intent of these corn processing rolls 22 is to provide increased capacity rolls 22 without utilizing a spiral circumferential groove that will shift crop material laterally as the crop material is passed between the rotating corn processing rolls 22. The first embodiment of the processing roll 22 shown in FIG. 2A is formed with the longitudinally extending grooves 23 running parallel with the axis of rotation of the processing roll 22, but a series of parallel spaced-apart circumferential grooves 32 divide the ridges 24 formed by the longitudinal grooves 23 into discrete teeth. With the use of the parallel grooves 32 forming spaced-apart rings around the outer circumference of the processing roll 22, the circumferential grooves 32 do not urge the movement of crop material passing between the processing rolls 22 to move toward one of the bearings and cause an overloading thereof.

The processing roll 22 incorporating the configuration of the second embodiment depicted in FIG. 2B and in the enlarged portion of the corresponding processing roll 22 shown in FIG. 3, is also formed with the longitudinally extending grooves 23 running parallel with the axis of rotation of the processing roll 22, but is intersected with a spiraled circumferential groove 35 formed in the shape of a chevron. In this second embodiment configuration, the circumferential groove 35 spirals in opposing directions from the opposing ends of the processing roll 22, meeting at the center in a V-shape, thus form the chevron configuration. As opposed to a continuous spiral circumferential groove extending from one end of the processing roll 22 to the other, as is known in the prior art, which causes the crop material being processed between the processing rolls to move toward one end of the processing roll 22, the chevron design will urge movement of the crop material being processed away from the opposing ends of the processing roll 22 and toward the center of the roll 22. Accordingly, with the chevron groove 35 configuration, as with the parallel circumferential groove 32 configuration, the bearings at one end of the processing roll 22 is not consistently overloaded.

Figure 3A:
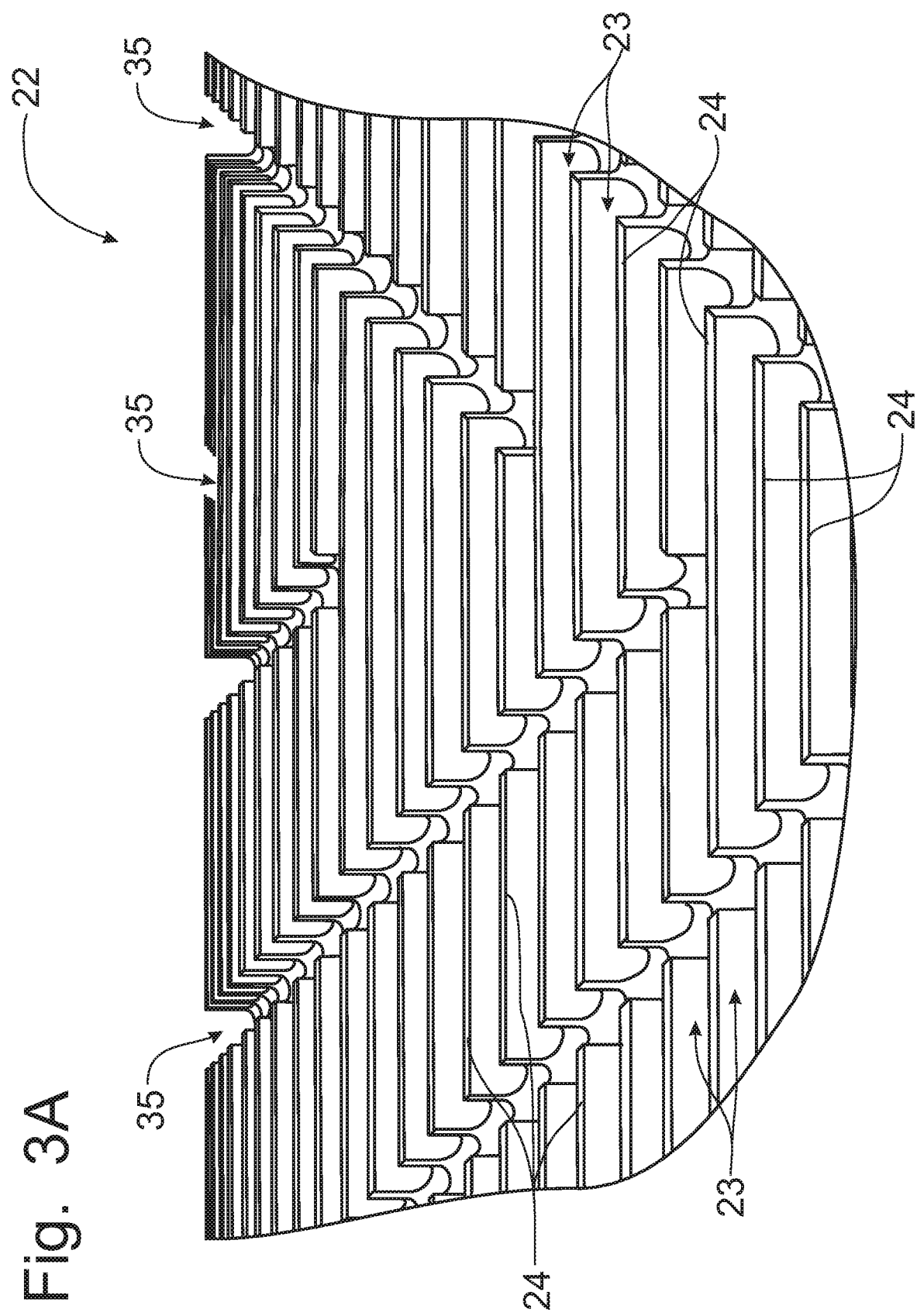
FIG. 3A is an enlarged perspective view of a central portion of the processing roll incorporating the configuration of the third embodiment of the instant invention as shown in FIG. 2C.

The configuration of the third embodiment of the instant invention as shown in FIG. 2C and in the enlarged portion of the corresponding processing roll shown in FIG. 3A, is similar to the second embodiment noted above, but leaves a gap between the oppositely slanted circumferential grooves 35. This semi-chevron configuration of circumferential grooves 35 does not create and leave a short tooth formed from the ridge 24 at the intersection of the oppositely oriented circumferential grooves 35. In other words, the "V" of the chevron grooves 35 in the second embodiment depicted in FIG. 2B will leave a short portion of the ridge 24 at the point of the "V". By stopping the circumferential grooves 35 prior to actually intersecting the oppositely winding circumferential groove 35, only longer teeth are created from the ridges 24, as compared to the length of the ridge segments 24 between parallel circumferential grooves 35, rather than forming shorter ridge segments (teeth).

Further, one skilled in the art will recognize that the chevron shape of the circumferentially extending grooves 35 as shown in either FIG. 2B or FIG. 2C, will either urge crop toward the center of the processing roll 22, or outwardly toward both opposing ends of the processing roll 22, depending on which direction the processing roll 22 is rotated. In either direction of rotation, i.e. whether the crop material is urged toward the center of the roll 22 or toward the opposing ends of the roll 22, the opposing bearings supporting the processing roll 22 for rotation about the axis of rotation will be equally loaded, and will not result in a premature failure of one of the bearings over the other.

FIGS. 4A-4C are schematic diagrams of several alternate embodiments of shapes for grooves forming the ridges of kernel processing rolls 22 of the invention. FIG. 4A depicts the preferred embodiment of the shape of the grooves 23, 32, 35 created by the machining of the processing rolls 22, formed with a bit that has parallel sides and a rounded tip, resulting in a groove 36 having generally vertical, parallel sides 37 joined by concave bottom 38 portion. FIG. 4B shows a second embodiment of the grooves 23, 32, 35 formed by a V-shaped bit resulting in sloping sides 39 that form a corresponding V-shape in the groove 36a. The third embodiment shown in FIG. 4C shows a groove 36b having a shape similar to that of FIG. 4A, but with only the rounded tip of the bit being engaged with the processing roll 22 to form just the concave bottom portion 38.

One skilled in the art will understand that many other groove shapes can be utilized in forming both the longitudinally extending grooves 23 and the circumferential grooves 32, 35, so long as the shape of the grooves, the spacing of the grooves and the configuration of the groove pattern does not result in corn kernels passing through the processing rolls 22 without being cracked. Accordingly, the configuration of the grooves 23, 32, 35 must meet the basic requirement that the groove size and shape must be such that the grooves prevent corn kernels from being lodged within the groove, and not allow corn kernels from passing between the processing rolls 22 without being cracked. Accomplishment of this goal can be had with the ridges of the crop processing roll being formed by a plurality of first deep grooves that extend in a parallel orientation to define grooves having a predetermined depth dimension, and then creating a series of second parallel grooves that are not as deep as the first grooves and are spaced further apart to break the formed ridges into discrete teeth.

Figure 6:
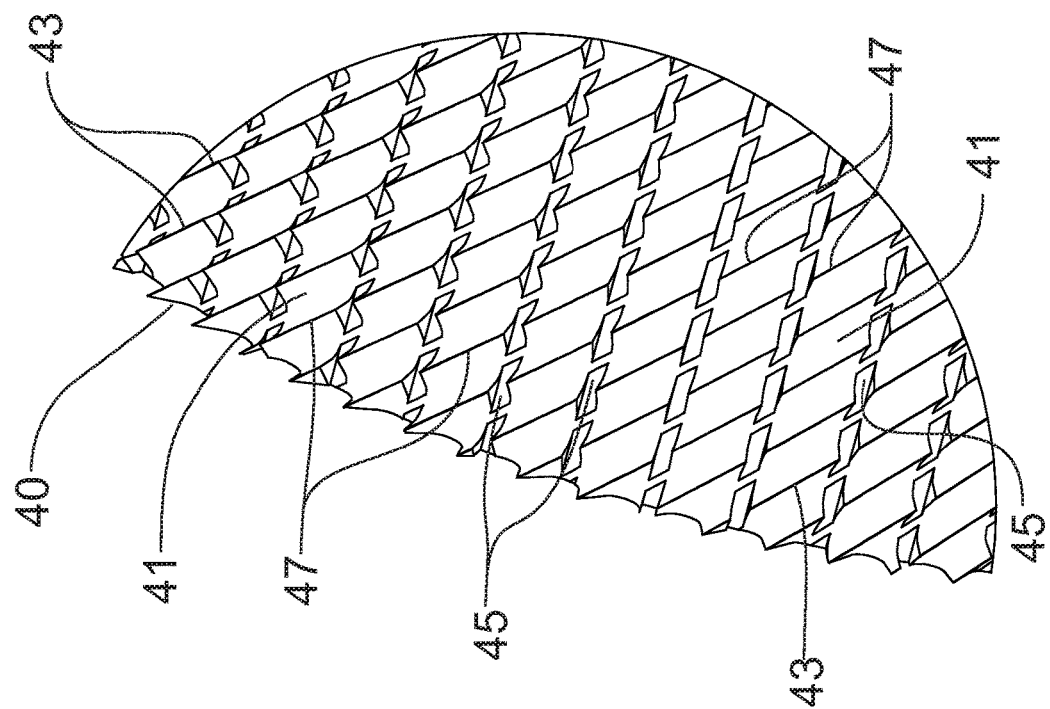
FIG. 6 is an enlarged partial perspective view of a portion of the segment of the fourth embodiment of a crop processing roll corresponding to circle A of FIG. 5.
Figure 5:
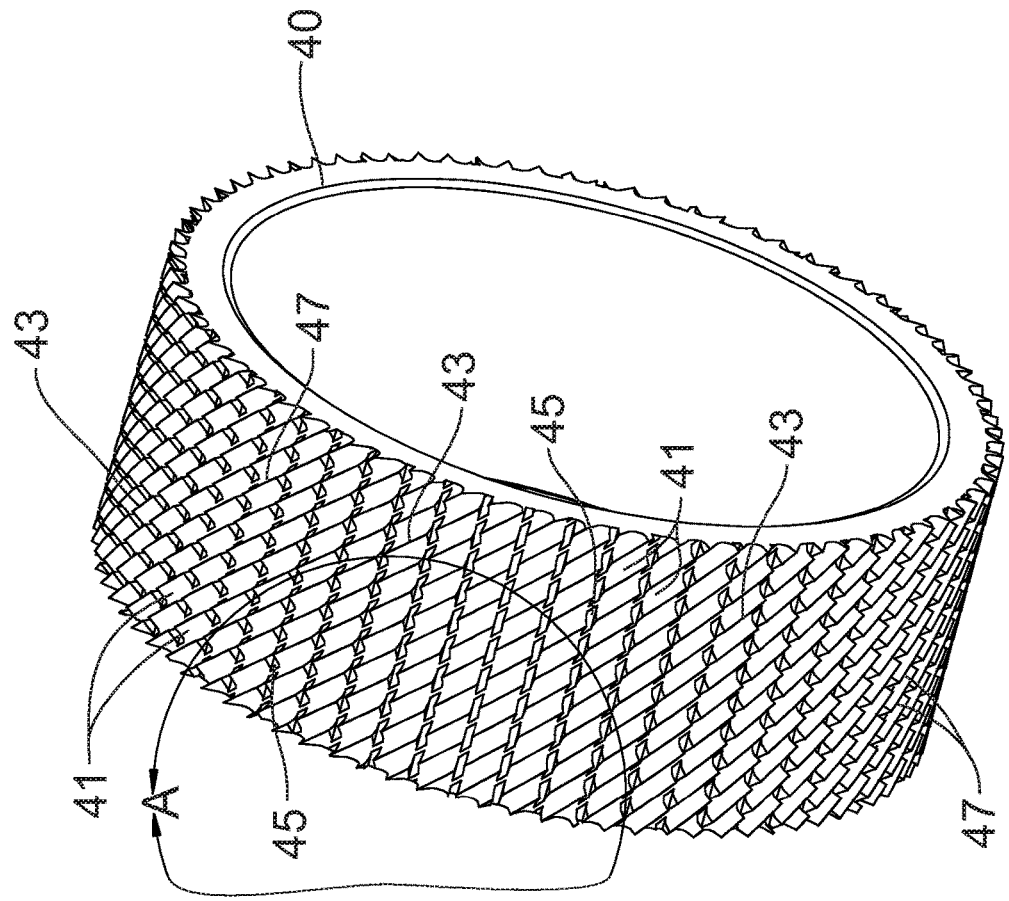
FIG. 5 is a perspective view of a segment of a crop processing roll depicting a fourth embodiment of the instant invention.

Referring now to the fourth embodiment of the instant invention depicted in FIGS. 5 and 6, one skilled in the art will recognize that the first grooves 41 are formed into the outer circumference of the roll cylinder 40 to create a series of parallel ridges 43 that are oriented in a diagonal or spiraled configuration across the circumferential surface of the roll cylinder 40. Preferably after the formation of the parallel ridges 43, the second grooves 45 are formed into the circumferential surface of the roll cylinder 40 to cut across the ridges 43 and form the discrete teeth 47 extending between adjacent second grooves 45. Preferably, the second grooves 45 are not as deep as the first grooves 41 to establish a solid base for the individual discrete teeth 47. In the fourth embodiment shown in FIGS. 5 and 6, the first grooves 41 are formed in a spiraled configuration around the circumferential surface of the roll cylinder 40, while the second grooves 45 are formed horizontally, i.e. longitudinally with reference to the axis of rotation of the roll cylinder 40. Furthermore, the same groove 41, 45 configuration can be utilized whether the underlying roll cylinder 40 is a full sized crop processing roll or a processing roll segment 40 as depicted in FIG. 5.

Figure 8:
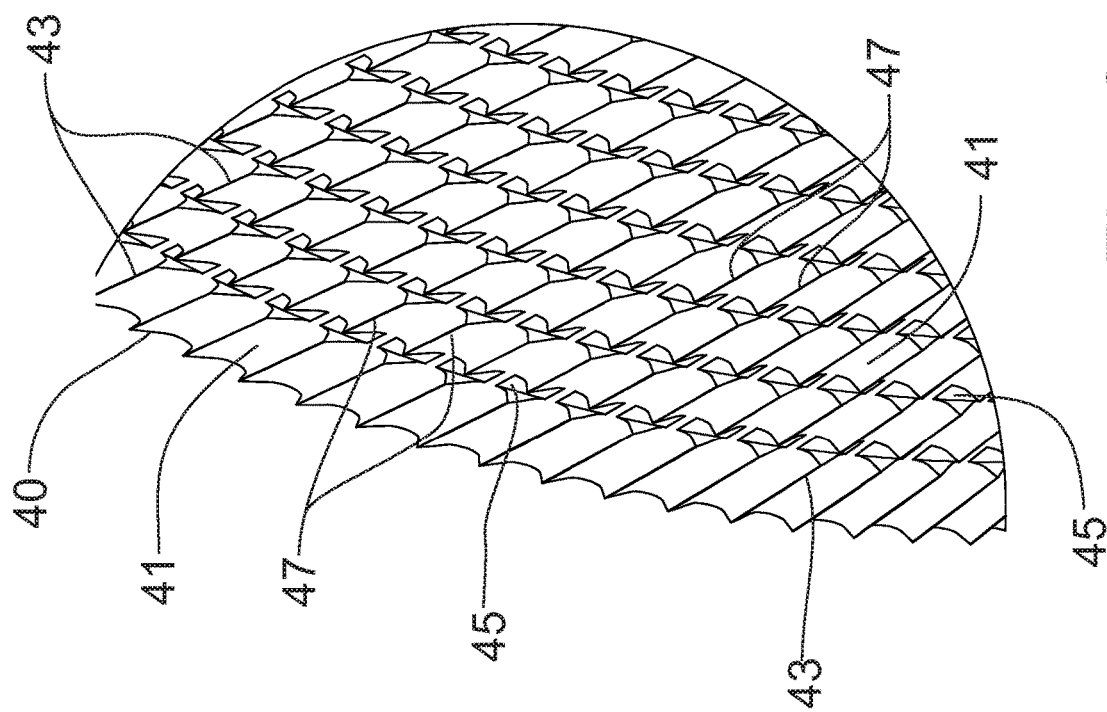
FIG. 8 is an enlarged partial perspective view of a portion of the segment of the fifth embodiment of a crop processing roll corresponding to circle D of FIG. 7.
Figure 7:
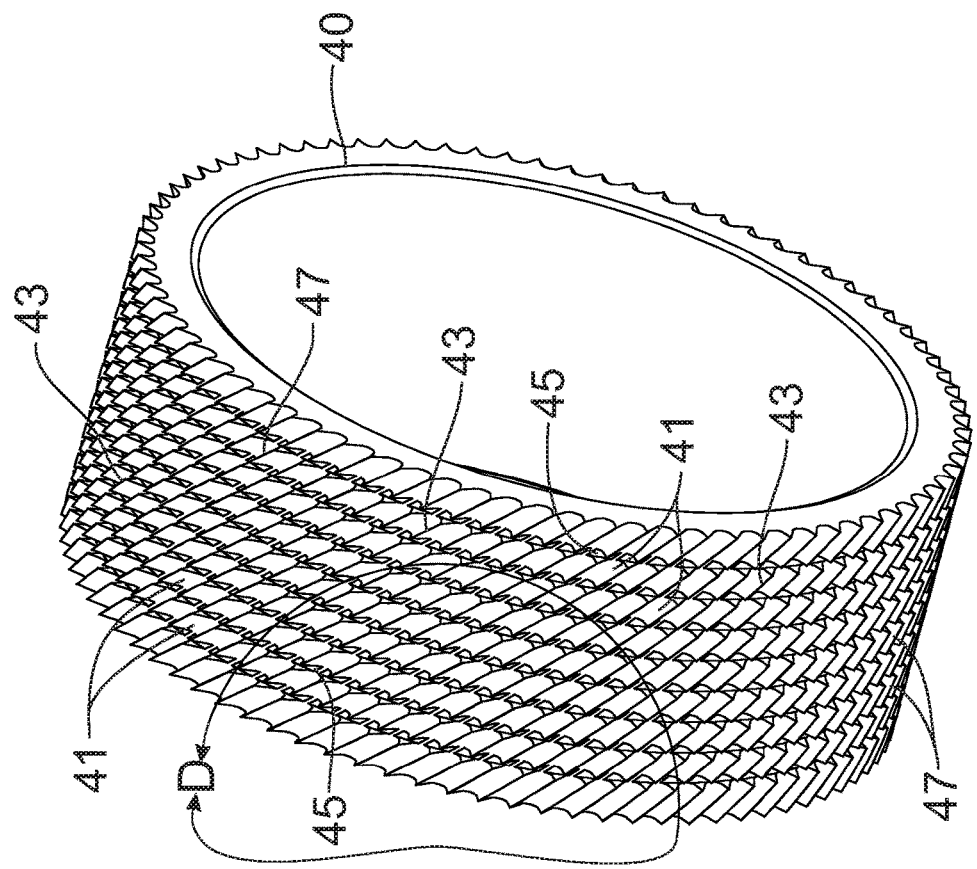
FIG. 7 is a perspective view of a segment of a crop processing roll depicting a fifth embodiment of the instant invention.

Referring now to the fifth embodiment depicted in FIGS. 7 and 8, one skilled in the art will recognize that the crop processing roll 40, or, as shown in FIG. 7, a segment 40 of a crop processing roll, can be formed in the same manner as described above, with the first grooves 41 extending diagonally, or spiraled, around the circumferential surface of the processing roll segment 40, in the same manner described above, to create the parallel spiraled ridges 43. However, the second grooves 45 are formed vertically, i.e. perpendicularly with respect to the axis of rotation of the roll or segment 40, as spaced apart rings along the longitudinal length of the roll or segment 40, to break the spiraled ridges 43 into individual discrete teeth 47.

Referring now to the sixth embodiment shown in FIGS. 9 and 10, one skilled in the art will recognize that the crop processing roll 40, or, as shown in FIG. 9, a segment 40 of a crop processing roll, can be formed in the same manner as described above, with the first grooves 41 extending diagonally, or spiraled, around the circumferential surface of the processing roll segment 40, in the same manner described above, to create the parallel spiraled ridges 43. However, the second grooves 45 are formed in an opposing spiraled configuration, with regard to the first grooves 41, to break the spiraled ridges 43 into individual discrete teeth 47. In the preferred sixth embodiment shown in FIGS. 9 and 10, the first grooves 41 and the ridges 43 formed therebetween extend diagonally from upper left to lower right, while the second grooves 45 extend from upper right to lower left in a manner to intersect the ridges 43 and form the individual discrete teeth 47.

Figure 11:
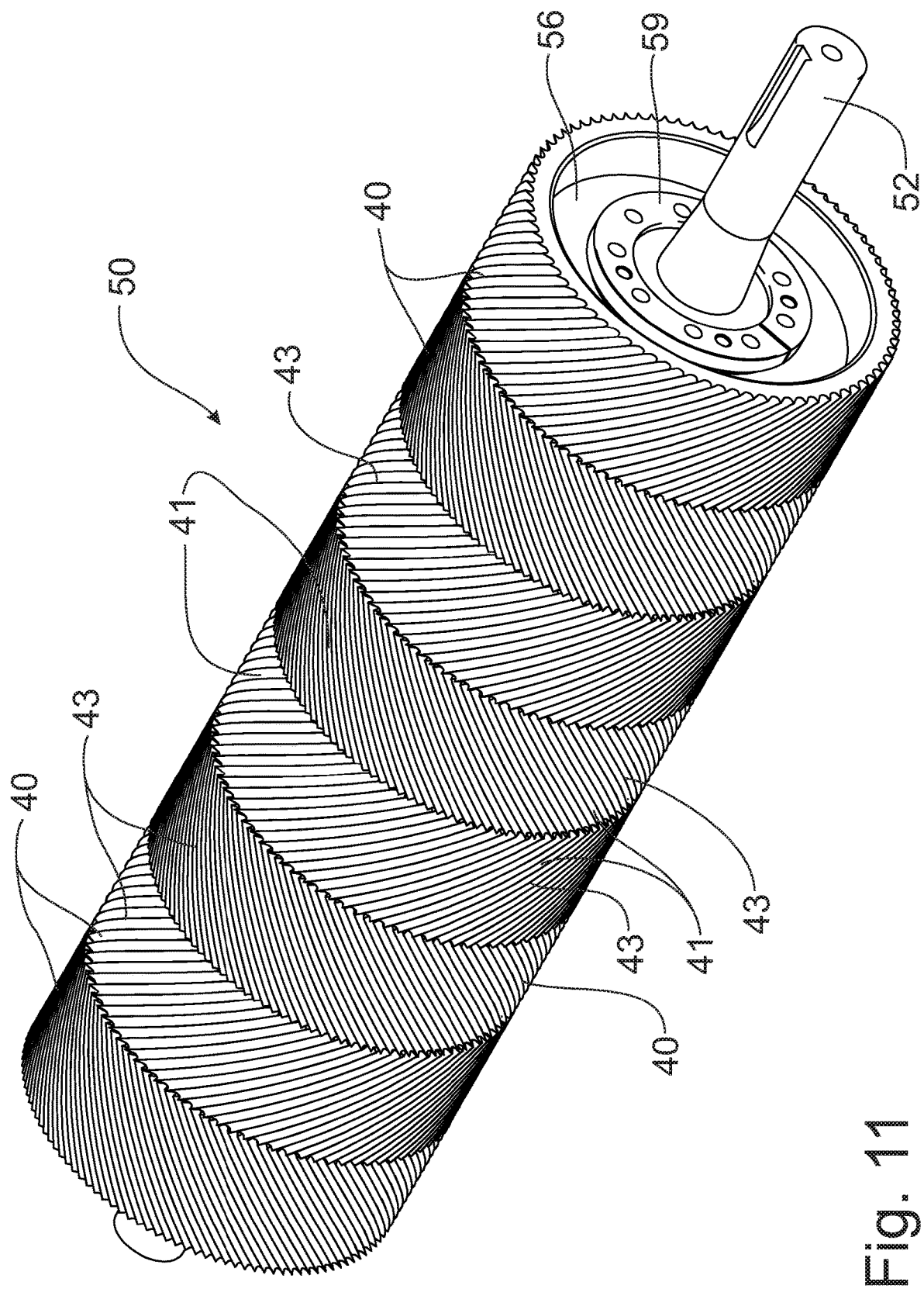
FIG. 11 is a perspective view of a crop processing roll assembled from a plurality of segments of the fourth, fifth or sixth embodiments with the formed diagonal discrete teeth oriented in opposing directions on adjacent segments.

Referring now to FIGS. 11 and 12, a segmented crop processing roll 50 formed from a plurality of segments 40, as shown in FIGS. 5, 7 and 9, can best be seen. The segmented crop processing roll 50 can be formed from any number of segments 40, from two segments 40 to perhaps eight segments, as is shown in FIG. 11. With the segments 40 formed in any of the fourth, fifth and sixth embodiments, as depicted in FIGS. 5, 7 and 9, the discrete teeth 47 are oriented in a diagonal direction with respect to the axis of rotation of the segmented roll 50. Accordingly, the segments 40 can be mounted in opposing directions to form a segmented crop processing roll 50 with a plurality of chevron groove configurations, as depicted in FIG. 11. One skilled in the art will recognize that the segmented crop processing roll 50 could be formed with segments 40 that only have the first grooves 41 formed therein without the second grooves 45 that form the ridges 43 into discrete teeth, which is the configuration depicted in FIG. 11.

While a number of different mounting structures can be devised to mount the individual segments 40 onto a drive shaft 52, the preferred embodiment of the mounting apparatus 55 is depicted in FIG. 12. A connecting ring 56 is welded to the interior of each segment 40 in a manner that will permit the passage of the shaft 52 through the open center of the connecting ring 56. A keyless bushing 57, such as a B-LOC keyless bushing manufactured by Fenner Drives, is used to secure the segments 40 onto the shaft 52. The keyless bushing 57 includes a block member 58 having an angled interior cam surface, and a compression hub or mounting collar 59 having a wedge portion that is operable to engage the cam surface of the block member 58.

Each segment 40 is mounted onto the shaft 52 individually by starting at one end of the shaft 52. The first segment 40 is slid over the shaft 52 and the block member 58 is moved into general engagement with the interior of the connecting ring 56. The mounting collar is then slid along the length of the shaft 52 until the wedge portion thereof is engaged with the interior cam surface of the block member 58. The placement of fasteners between the mounting collar 59 and the block member 58 pulls the two components 58, 59 of the keyless bushing 57 together as the wedge portion of the mounting collar 59 drives the block member 58 outward into an interference fit with the interior surface of the connecting ring 56, thus fixing the first segment 40 in place on the shaft 52.

The next segment 40 is then properly oriented and slid along the shaft 52 to abut the previous segment 40. The insertion of the block member 58 and then the mounting collar 59 is repeated for this segment. Whereupon, the keyless bushing 57 secures the next segment 40 on the shaft 52. This process is repeated for each segment 40 to be installed on the shaft 52 until all of the segments 40 have been secured to the shaft 52. With the proper orientation of the respective segments 40, the segmented crop processing roll 50 will be formed with multiple chevron groove patterns, as is depicted on FIG. 11.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A crop processing roll for use in a forage harvester to process crop material comminuted by the operation of the forage harvester before being discharged from the forage harvester, comprising:
   an elongated cylindrical body formed from multiple independent segments supported together and mounted on a central drive shaft so as to be rotational together about an axis of rotation corresponding to said central drive shaft, each segment having formed therein a plurality of parallel first grooves defining parallel ridges therebetween, said parallel ridges being oriented other than parallel to said axis of rotation; and
   a plurality of second grooves formed in each segment of said elongated cylindrical body spaced apart and oriented to intersect the ridges to divide the ridges into discrete teeth having a length dimension extending between adjacent second grooves, each said segment having said ridges oriented diagonally along said segment, adjacent said segments being oriented to present a chevron pattern for said first grooves and said ridges on the adjacent segments.

2. The crop processing roll of claim 1 wherein said first grooves are oriented in a diagonal direction relative to an axis of rotation of said crop processing roll, said second grooves being oriented in a horizontal direction extending parallel to said axis of rotation of said crop processing roll.

3. The crop processing roll of claim 1 wherein said first grooves are oriented in a diagonal direction relative to an axis of rotation of said crop processing roll, said second grooves being oriented in a vertical direction forming circumferential rings spaced apart longitudinally with respect to said axis of rotation of said crop processing roll.

4. The crop processing roll of claim 1 wherein said first grooves are oriented in a diagonal direction relative to an axis of rotation of said crop processing roll, said second grooves being oriented in a diagonal direction opposing the diagonal direction of said first grooves so that said second grooves intersect the ridges formed by said first grooves to form said discrete teeth.

5. The crop processing roll of claim 1 wherein said first grooves have a depth dimension that is larger than a corresponding depth dimension of said second grooves.

6. The crop processing roll of claim 1 wherein each said segment is formed with a connecting ring welded to an interior surface of said segment, each said segment being mounted on said drive shaft by a keyless bushing having a block member engagable with an interior surface of said connecting ring and a mounting collar having a wedge portion engagable with a corresponding cam surface on said block member to push said block member radially outwardly into a driving engagement with said connecting ring.

7. A corn processing roll for use in a forage harvester to process corn kernels passing through said forage harvester before being discharged from the forage harvester, comprising:
   a central drive shaft;
   an elongated cylindrical body formed from multiple independent cylindrical segments mounted adjacent one another on said central drive shaft extending through said segments, each said segment being formed with a plurality of parallel first grooves defining parallel ridges therebetween, said ridges extending in a diagonal direction along each respective said segment; and
   each said segment being formed with a connecting device mounted to an interior surface of said segment for engagement with said central drive shaft to affect rotation of the segment, each said connecting device being formed as a connecting ring welded to said interior surface of the corresponding said segment, each said segment being mounted on said drive shaft by a keyless bushing having a block member engagable with an interior surface of said connecting ring and a mounting collar having a wedge portion engagable with a corresponding cam surface on said block member to push said block member radially outwardly into a driving engagement with said connecting ring.

8. The corn processing roll of claim 7 wherein adjacent said segments are mounted on said central drive shaft in a manner to define a chevron pattern for said first grooves and said ridges on the adjacent segments.

9. The corn processing roll of claim 7 wherein each said segment includes a plurality of second grooves formed into said segment to intersect said ridges and divide said ridges into discrete teeth extending between adjacent said second grooves.

10. The corn processing roll of claim 9 wherein said second grooves are oriented in a horizontal direction extending parallel to said axis of rotation of said crop processing roll.

11. The corn processing roll of claim 9 wherein said second grooves are oriented in a vertical direction forming circumferential rings spaced apart longitudinally with respect to said axis of rotation of said crop processing roll.

12. The corn processing roll of claim 9 wherein said second grooves are oriented in a diagonal direction opposing the diagonal direction of said first grooves so that said second grooves intersect the ridges formed by said first grooves to form said discrete teeth.

13. The crop processing roll of claim 9 wherein said first grooves have a depth dimension that is larger than a corresponding depth dimension of said second grooves.

14. A segmented crop processing roll for use in a forage harvester to process crop material comminuted by the operation of a forage harvester before being discharged from the forage harvester, comprising:

a central drive shaft;

an elongated cylindrical body formed from multiple independent cylindrical segments mounted on said central drive shaft extending through all of said segments, each said segment being formed with a plurality of parallel first grooves defining parallel ridges therebetween, said ridges extending in a diagonal direction along each respective said segment, each said segment also having a plurality of parallel second grooves oriented to intersect said ridges to divide said ridges into discrete teeth extending between adjacent said second grooves, each said segment having said ridges oriented diagonally along said segment, adjacent said segments being oriented to present a chevron pattern for said first grooves and said ridges on the adjacent segments; and each said segment being formed with a connecting device mounted to an interior surface of said segment for engagement with said central drive shaft to affect rotation of the segment.

15. The crop processing roll of claim 14 wherein adjacent said segments are oriented to define a chevron pattern for said first grooves and said ridges on the adjacent segments, said second grooves being oriented in one of a horizontal direction extending parallel to said axis of rotation of said crop processing roll, a vertical direction forming circumferential rings spaced apart longitudinally with respect to said axis of rotation of said crop processing roll, and a diagonal direction opposing the diagonal direction of said first grooves so that said second grooves intersect the ridges formed by said first grooves to form said discrete teeth.

16. The crop processing roll of claim 14 wherein said first grooves have a depth dimension that is larger than a corresponding depth dimension of said second grooves such that each said ridge provides a base for the corresponding discrete teeth thereof.

17. The crop processing roll of claim 16 wherein each said connecting device is formed as a connecting ring welded to an interior surface of said segment, each said segment being mounted on said drive shaft by a keyless bushing having a block member engagable with an interior surface of said connecting ring and a mounting collar having a wedge portion engagable with a corresponding cam surface on said block member to push said block member radially outwardly into a driving engagement with said connecting ring.

* * * * *